United States Patent [19]

Gonzales et al.

[11] Patent Number: 5,780,376
[45] Date of Patent: Jul. 14, 1998

[54] ORGANOCLAY COMPOSITIONS

[75] Inventors: Antonio Gonzales, Moulton, Tex.; Kevin L. Nichols, Midland, Mich.; Clois E. Powell, Seguin, Tex.; Bruce P. Thill, Midland, Mich.

[73] Assignees: Southern Clay Products, Inc., Gonzales, Tex.; The Dow Chemical Company, Midland, Mich.

[21] Appl. No.: 802,758

[22] Filed: Feb. 20, 1997

Related U.S. Application Data

[60] Provisional application No. 60/012,143, Feb. 23, 1996.

[51] Int. Cl.$^6$ ...................................................... C09C 1/42
[52] U.S. Cl. ........................ 501/146; 106/468; 106/487; 252/315.2; 252/315.5; 501/148
[58] Field of Search .................................. 106/468, 487; 252/315.2, 315.5; 501/146, 148

[56] References Cited

U.S. PATENT DOCUMENTS

| | | |
|---|---|---|
| 2,966,506 | 12/1960 | Jordan. |
| 3,252,757 | 5/1966 | Granquist. |
| 3,586,478 | 6/1971 | Neumann. |
| 3,666,407 | 5/1972 | Orlemann. |
| 3,671,190 | 6/1972 | Newuman. |
| 3,844,978 | 10/1974 | Hickson. |
| 3,844,979 | 10/1974 | Hickson. |
| 3,852,405 | 12/1974 | Granquist. |
| 3,855,147 | 12/1974 | Granquist. |
| 4,033,764 | 7/1977 | Colegate et al.. |
| 4,081,496 | 3/1978 | Finlayson. |
| 4,105,578 | 8/1978 | Finlayson et al.. |
| 4,116,866 | 9/1978 | Finlayson. |
| 4,208,218 | 6/1980 | Finlayson. |
| 4,391,637 | 7/1983 | Mardis et al.. |
| 4,410,364 | 10/1983 | Finlayson et al.. |
| 4,412,018 | 10/1983 | Finlayson et al.. |
| 4,425,244 | 1/1984 | House. |
| 4,434,075 | 2/1984 | Mardis et al.. |
| 4,434,076 | 2/1984 | Mardis et al.. |
| 4,450,095 | 5/1984 | Finlayson. |
| 4,517,112 | 5/1985 | Mardis et al.. |
| 4,677,158 | 6/1987 | Tso et al.. |
| 4,695,402 | 9/1987 | Finlayson et al.. |
| 4,739,007 | 4/1988 | Okada et al.. |
| 4,743,305 | 5/1988 | Doidge et al.. |
| 4,810,734 | 3/1989 | Kawasumi et al.. |
| 4,889,885 | 12/1989 | Usuki et al.. |
| 4,894,411 | 1/1990 | Okada et al.. |
| 5,151,155 | 9/1992 | Cody et al.. |
| 5,429,999 | 7/1995 | Nae et al.. |

FOREIGN PATENT DOCUMENTS 62-85982  4/1987  Japan.

OTHER PUBLICATIONS

Kirk et al. ed. (1982) Encyclopedia of Chem. Technol., p. 521–531 (no month).

*Primary Examiner*—Michael Marcheschi
*Attorney, Agent, or Firm*—Klauber & Jackson

[57] ABSTRACT

Organoclay compositions which comprise the reaction product of a smectite-type clay having an ion exchange capacity of at least 50 meq. wt. per 100 g. clay (active basis), and mixture of a quaternary ammonium compound and a chain transfer agent which is a thiol, α-methylketone, α-methylalcohol or a halogen compound are useful agents for use in the processes for the preparation of thermoplastic materials.

8 Claims, 4 Drawing Sheets

ORGANOCLAY COMPOSITIONS

RELATED APPLICATION

This application claims priority from U.S. provisional application Ser. No. 60/012,143, filed Feb. 23, 1996.

BACKGROUND OF THE INVENTION

This invention relates generally to organoclays, and, more specifically, to improved organoclays which are produced by the reaction of the organoclay with an chain transfer agent.

Organoclays, representing the reaction product of a smectite-type clay with a quaternary ammonium compound, have long been known for use in gelling of organic liquids such as lubricating oils, linseed oil, toluene and the like. A large variety of highly useful products, such as lubricating greases, are producible through use of such gelling agents. The procedures and chemical reactions pursuant to which these organoclays are prepared, are well-known. Thus, under appropriate conditions, the organic compound which contains a cation, will react by ion exchange with the clay which contains a negative layer lattice and exchangeable cations to form the organoclay products.

Other uses for such modified organoclays are those such as are disclosed in U.S. Pat. No. 5,151,155, wherein organically modified smectite clays are utilized in a process for deinking wastepaper, and in U.S. Pat. No. 4,677,158, wherein smectite-type clays which have been reacted with quaternary ammonium compounds are utilized as thickeners for aqueous suspensions, particularly latex paints and caulks. These modified organoclays differ from those of the present invention in the type of the agent with which they are intercalated. This modification produces organoclays with properties which make them suitable for use in the manufacture of thermoplastics.

OBJECTS OF THE INVENTION

It is an object of the present invention to prepare organoclay compositions having properties making them useful for the manufacture of thermoplastic compositions.

SUMMARY OF THE INVENTION

In accordance with the present invention, it has unexpectedly been discovered that smectite-type clays, particularly montmorillonites, can be intercalated with particular agents which provide carbon-carbon double bonds, or serve as chain transfer agents, for free radical polymerization reactions. The thus produced organoclays can be utilized in the manufacture of thermoplastics, and particularly in the free radical polymerization of thermoplastics such as polystyrene and high impact polystyrene.

Thus, the present invention is concerned with an organoclay composition comprising the reaction product of a smectite-type clay having an ion exchange capacity of at least 50 meq. wt. per 100 g. clay (active basis), and mixture of a quaternary ammonium compound with either another quaternary ammonium compound containing a carbon-carbon double bond, or a chain transfer agent which is a thiol, α-methylketone, α-methylalcohol or a halogen compound.

BRIEF DESCRIPTION OF THE DRAWING FIGURES

DESCRIPTION OF PREFERRED EMBODIMENTS

Figure 1:
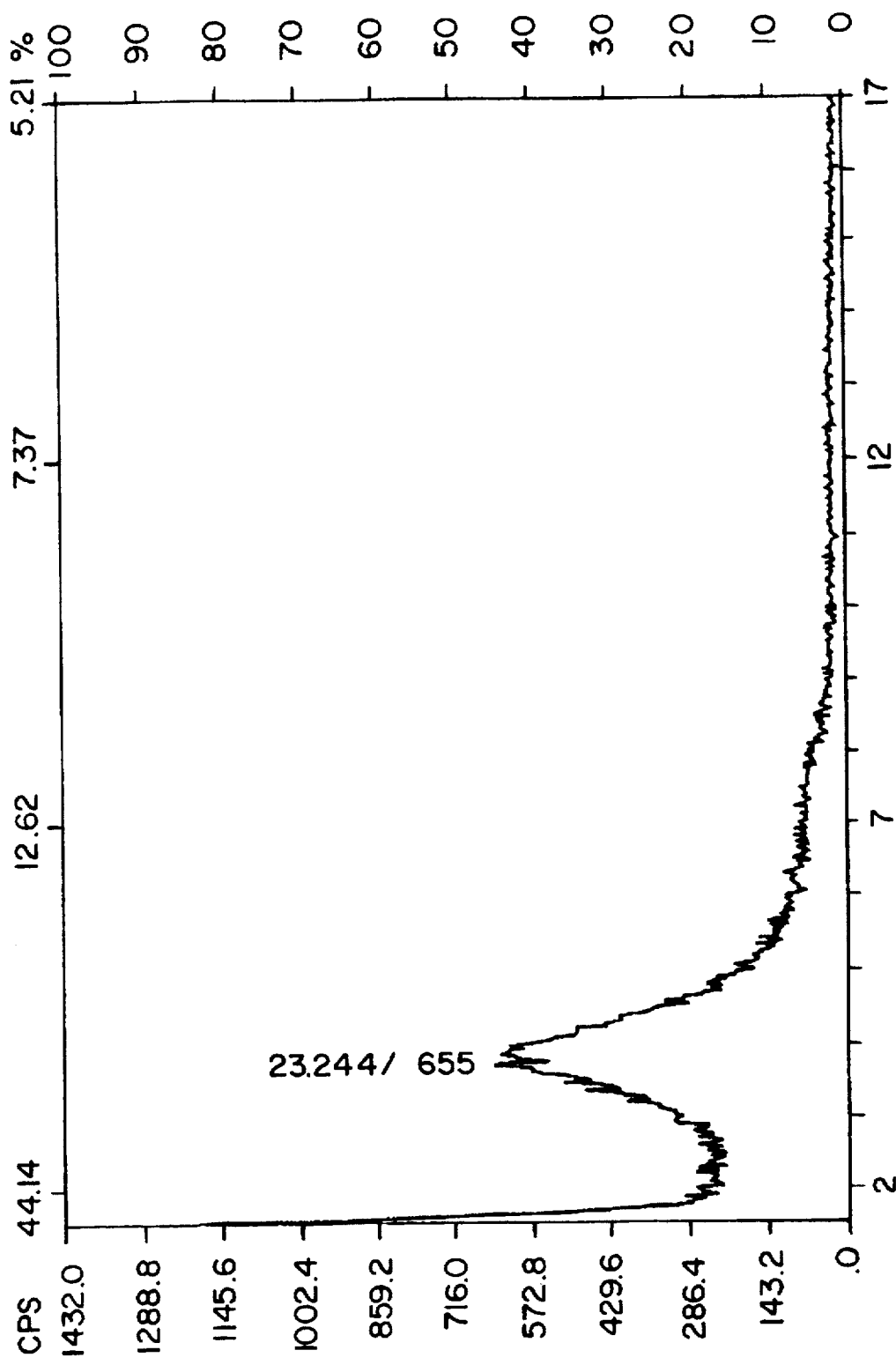
FIG. 1 is a d-spacing tracing of a montmorillonite clay intercalated with 80 mer dimethyl-di-hydrogenated tallow ammonium chloride (2M2HT) and 10 mer DL-cysteine.

The smectite clays which are utilized as one of the starting materials of the present invention are those which have been conventionally utilized in the prior art. Suitable smectite-type clays are those which have a cation exchange capacity of at least 50 milliequivalents (meq.) weight (wt.) per 100 grams of clay (active basis). Useful clays for such purposes include the naturally occurring Wyoming variety of swelling bentonite and similar clays, and hectorite, which is a swelling magnesium-lithium silicate clay. The clays are preferably converted to the sodium form if they are not already in this form. This can be effected, again as is known in the art, by a cation exchange reaction, or the clay can be converted via an aqueous reaction with a soluble sodium compound.

Smectite-type clays prepared synthetically can also be utilized, such as montmorillonite, bentonite, beidelite, hectorite, saponite, and stevensite. Such clays, and processes for their preparation, are described in U.S. Pat. Nos. 4,695,402, 3,855,147, 3,852,405, 3,844,979, 3,844,978, 3,671,190, 3,666,407, 3,586,478, and 3,252,757, all of which are herein incorporated by reference.

The quaternary ammonium compounds which can be utilized in the compositions of the present invention are known agents typically utilized in the preparation of organoclays and include alkyl ammonium compounds of the formula:

(I)

wherein $R_1$, $R_2$, $R_3$ and $R_4$ are independently selected from the group consisting of lineal or branched, saturated or unsaturated alkyl groups having 1 to 22 carbon atoms, aralkyl groups which are benzyl and substituted benzyl moieties, aryl group, beta, gamma-unsaturated groups having six or less carbon atoms, hydroxyalkyl groups having two to six carbon atoms, and hydrogen, with the proviso that at least one of the substituents is a lineal or branched saturated or unsaturated alkyl group; and X is the salt anion.

In formula I, the aralkyl groups include benzyl and substituted benzyl moieties including fused ring moieties, and have an alkyl portion consisting of lineal or branched chains of 1 to 22 carbon atoms. The aryl groups are those such as phenyl and substituted phenyl, including fused ring aromatic substituents.

The long chain alkyl groups may be derived from natural occurring oils including various vegetable oils, such as corn oil, coconut oil, soybean oil, cottonseed oil, castor oil and the like, as well as various animal oils or fats such as tallow oil. The alkyl radicals may likewise be petrochemically derived such as from alpha olefins.

Representative examples of useful branched, saturated groups include 12-methylstearyl and 12-ethylstearyl. Representative examples of useful branched, unsaturated radicals include 12-methyloleyl and 12-ethyloleyl. Representative examples of useful branched, saturated radicals include lauryl, stearyl, tridecyl, myristyl (tetradecyl), pentadecyl, hexadecyl, hydrogenated tallow, docosanyl. Representative examples of unbranched, unsaturated and unsubstituted groups include oleyl, linoleyl, linolenyl, soya and tallow.

Examples of aralkyl include benzyl and substituted benzyl moieties such as those derived from benzyl halides, benzhydryl halides, trityl halides, α-halo-α-phenylalkanes wherein the alkyl chain has from 1 to 22 carbon atoms, such as 1-halophenylethane, 1-halo-1-phenyl propane and 1-halo-1-phenyloctadecane.

Substituted benzyl moieties, such as would be derived from ortho-, meta- and para-chlorobenzyl halides, para-methoxybenzyl halides, ortho-, meta and para-nitrilobenzyl halides, and ortho-, meta and para-alkylbenzyl halides wherein the alkyl chain contains from 1 to 22 carbon atoms; and fused ring benzyl-type moieties, such as would be derived from 2-halomethylnaphthalene, 9-halomethylanthracene and 9-halomethylphenanthrene, wherein the halo group would be defined as chloro, bromo, iodo, or any other such group which serves as a leaving group in the nucleophilic attack of the benzyl type moiety such that the nucleophile replaces the leaving group on the benzyl type moiety.

Examples of aryl groups would include phenyl such as in N-alkyl and N,N-Ndialkyl anilines, wherein the alkyl groups contain between 1 to 22 carbon atoms; ortho-, meta and pre-nitrophenyl, ortho-, meta- and para-alkyl phenyl, wherein the alkyl group contains between 1 and 22 carbon atoms, 2-, 3-, and 4-halophenyl wherein the halo group is defined ass chloro, bromo, or iodo, and 2-, 3-, and 4-carboxyphenyl and esters thereof, where the alcohol of the ester is derived from an alkyl such as carbon atoms, aryl such as phenol, or aralkyl such as benzyl alcohols; fused ring aryl moieties such as naph-thalene, anthracene, and phenanthrene.

The β,γ-unsaturated alkyl group may be selected from a wide range of materials. These compounds may be cyclic or acyclic, unsubstituted or substitute with aliphatic radicals containing up to 3 carbon atoms such that the total number of aliphatic carbons in the β,γ-unsaturated radical is 6 or less. The β,γ-unsaturated alkyl radical may be substituted with an aromatic ring that likewise is conjugated with he unsaturation of the β,γ-moiety or the β,γ-radical is substituted with both aliphatic radicals and aromatic rings.

Representative examples of cyclic β,γ-unsaturated alkyl groups include 2-cyclohexenyl and 2-cyclopentenyl. Representative examples of acyclic β,γ-unsaturated alkyl groups containing 6 or less carbon atoms include propargyl; allyl (2-propeny); croty(2-butenyl); 2-pentenyl; 2-hexenyl; 3-methyl-2-butenyl; 3-methyl-2-pentenyl; 2,3-dimethyl-2-butenyl; 1,1-dimethyl-2-propenyl; 1,2-dimethyl propenyl; 2,4-pentadienyl; and 2,4-hexadienyl. Representative examples of acyclic-aromatic substituted compounds include cinnamyl (3-phenyl-2-propenyl); 2-phenyl-2-propenyl; and 3-(4-methoxyphenyl)-2-propenyl. Representative examples of aromatic and aliphatic substituted materials include 3-phenyl-2-cyclohexenyl; 3-phenyl-2-cyclopentenyl; 1,1-dimethyl-3-phenyl-2-propenyl; 1,1,2-trimethyl-3-phenyl-2-propenyl; 2,3-dimethyl-3-phenyl-2-propenyl; 3,3-dimethyl-2-phenyl-2-propenyl; and 3-phenyl-2-butenyl.

The hydroxyalkyl group is selected from a hydroxyl substituted aliphatic radical wherein the hydroxyl is not substituted at the carbon adjacent to the positively charged atom, and the group has from 2 to 6 aliphatic carbons. Representative examples include 2-hydroxy-yethyl (ethanol); 3-hydroxypropyl; 4-hydroxypentyl; 6-hydroxyhexyl; 2-hydroxypropyl (isopropanol); 2-hydroxybutyl; 2-hydroxypentyl; 2-hydroxyhexyl; 2-hydroxycyclohexyl; 3-hydroxycyclohexyl; 4-hydroxypentyl; 2-hydroxycyclopentyl; 3-hydroxycyclopentyl; 2-methyl-2-hydroxypropyl; 1,1,2-trimethyl-2-hydroxypropyl; 2-phenyl-2-hydroxyethyl; 3-methyl-2-hydroxybutyl; and 5-hydroxy-2-pentenyl.

A preferred compound of Formula I contains at least one linear or branched, saturated or unsaturated alkyl group having 12 to 22 carbon atoms and at least one linear or branched, saturated or unsaturated alkyl group having 1 to 12 atoms. The preferred compound of Formula I may also contain at least one aralkyl group having a linear or branched, saturated or unsaturated alkyl group having 1 to 12 carbons in the alkyl portion. Mixtures of these compounds may also be used.

Especially preferred compound of Formula I is a compound where $R_1$ and $R_2$ are hydrogenated tallow, $R_3$ and $R_4$ are methyl or where $R_1$ is hydrogenated tallow, $R_2$ is benzyl and $R_3$ and $R_4$ are methyl or a mixture thereof such as 90% (equivalents) of the former and 10% (equivalents) of the latter.

The salt anion of the ammonium salt may be methosulfate, ethosulfate, methylcarbonate, ethylcarbonate, chloride, bromide, or mixtures thereof, and is most preferably a methosulfate ion. The salt anion may also, however, be nitrate, hydroxide, acetate, or mixtures of these.

Illustrative of the numerous patents which describe organic cationic salts, their manner of preparation and their use in the preparation of organophilic clays are commonly assigned U.S. Pat. Nos. 2,966,506, 4,081,496, 4,105,578, 4116,866, 4,208,218, 4,391,637, 4,410,364, 4,412,018, 4,434,075, 4,434,076, 4,450,095 and 4,517,112, the contents of which are incorporated by reference.

The quaternary ammonium compound which contains a carbon-carbon double bond for the free radical polymerization can be any of the above-described compounds of formula I which contain the necessary double bond. In a preferred embodiment, the organoclay of the present invention thus contains two different types of quaternary ammonium compounds. Alternatively, a chain transfer agents can be included in place of the second quaternary compound. These include thiols, for example DL-cysteine, α-methylketones, such as acetone, α-methylalcohols, such as isopropanol, or halogen compounds, such as chloroform and carbontetrachloride. Particularly useful, due to its efficiency in chain transfer processes, is DL-cysteine.

The chain transfer agent present in combination with the quaternary ammonium salt in the organoclays of the present invention determine the particularly advantageous properties of the resultant organoclays of the present invention. Thus, the incorporation of the chain transfer agents with the quaternary ammonium compound provide modified organoclays which can be directly utilized in the process for the preparation of thermoplastics, and particularly polystyrene and high impact polystyrene materials.

Highly preferred embodiments of the present invention are organoclays which comprise the reaction product of smectite-type clays with a mixture of a quaternary ammonium compound such as dimethyl-di-hydrogenated tallow ammonium chloride and DL-cysteine.

The quaternary ammonium compounds useful in the present invention of the present invention can be prepared by various methods known by those of ordinary skill in the art. In a preferred method, the quaternary ammonium compound is prepared by the reaction of a tertiary amine and an alkylating agent. Some alkylating agents, well known to those practicing the art, include organic halides such as methyl chloride, diorganosulfates such as dimethyl sulfate, or diorgano carbonates, such as dimethyl carbonate. This method of preparation is described in ENCYCLOPEDIA OF CHEMICAL TECHNOLOGY edited by Kirk/Othmer (Third Edition, Vol 19, page 521–531) which is incorporated herein by reference. Many of the quaternary ammonium compounds, such as dimethyl-di-hydrogenated tallow ammonium chloride, are also commercially available in industrial quantities.

The amount of the quaternary ammonium compound reacted with the smectite-type clay depends upon the specific clay and the desired end use. Typically, the amount of cation ranges from about 0.1 to about 150%, preferably from about 100 to about 130% of the cation exchange capacity of the clay. Thus, for example, when bentonite is used, the amount of cation reacted with the clay will range from about 85 to about 143 milliequivalents, preferably from about 95 to about 124 milliequivalents per 100 grams of clay, 100% active basis.

The amount of the chain transfer agent reacted with the smectite-type clay depends upon the specific clay and the desired end use. Typically, the amount of cation ranges from about 0.1 to about 150%, preferably from about 100 to about 130% of the cation exchange capacity of the clay. Thus, for example, when bentonite is used, the amount of cation reacted with the clay will range from about 85 to about 143 milliequivalents, preferably from about 95 to about 124 milliequivalents per 100 grams of clay, 100% active basis.

A further embodiment of the present invention is the process for preparing the organoclay composition comprising the reaction product of a smectite-type clay having an ion exchange capacity of at least 50 meq. wt. per 100 g. clay (active basis), and a mixture of a quaternary ammonium compound and a chain transfer agent which comprises:

a) dispersing a smectite type clay having an ion exchange capacity of at least 50 meq. wt. per 100 g. clay in an aqueous media;

b) heating the dispersing of step (a) to a temperature in excess of 30° C.;

c) adding the heated dispersion of step (b) of the quaternary ammonium salt, in the desired milliequivalent ratio;

d) adding the mixture of step (c) to a solution of the chain transfer agent, pretreated with a strong mineral acid, if necessary; and e) agitating the mixture of step (d) to effect completion of the reaction.

The organoclay composition of the present invention is thus prepared by admixing an aqueous dispersion of the smectite-type clay, warmed to a temperature in excess of 30° C., with a quaternary ammonium compound and the chain transfer agent to exchange the metal counterions that are naturally present in the smectite-type clay. The reaction is typically conducted at a temperature within the range of from about 40° C. to about 100° C. for a period of time sufficient for the quaternary ammonium compound and the chain transfer agent to react with the clay particles.

Preferably, the clay is dispersed in the water at a concentration from about 3% to about 15% by weight and the slurry is centrifuged to remove non-clay impurities. The slurry is then agitated and heated to the desired temperature, and the quaternary ammonium salt added in the desired milliequivalent ratio. To this mixture is then added the chain transfer agent which has, if necessary, been pretreated, typically by the addition of a strong mineral acid such as hydrochloric acid, to result in the protonated form, in the desired milliequivalent ratio. The quaternary ammonium compounds are typically liquids, but they can be dispersed in water to facilitate the reaction. Agitation is continued to effect completion of the reaction.

The amount of the quaternary ammonium compound and the chain transfer agent added to the smectite-type clay for the purposes of this invention must be sufficient to impart to the clay the enhanced characteristics desired. The milliequivalent ratio is defined as the number of milliequivalents of the alkoxylated quaternary ammonium compound, per 100 grams of clay, 100% active basis. The typical smectite-type clays of this invention have a milliequivalent ratio of from about 10 to about 150. The preferred milliequivalent ratio will vary depending on the characteristics of the particular quaternary ammonium compound and the chain transfer agent utilized and the end use for the resultant product.

The organoclay composition of the present invention is utilized as an additive to polymer composites and molding compositions, and especially to enhance the properties of same. The polymer composites possess improved physical properties i.e. heat and chemical resistance and barrier properties and have utility as automotive parts, aircraft parts, building materials, durables, coatings, films, food packaging and computer housings.

These polymer composites exhibit reduced thermal expansion, improved dimensional stability, enhanced barrier properties, exhanced modulus, even when exposed to polar media such as water or methanol, improved ignition resistance and nondrip characteristics, and enhanced heat resistance as compared to the compositions which do not include the interelated inorganic substrate.

These polymer composites can also be molded into articles of manufacture by conventional shaping processes, such as melt spinning, casting, vacuum molding, injection molding and extruding. Examples of such molded articles are components for technical equipment, durables, apparatus castings, household equipment, sports equipment, bottles, containers, components for the electrical and electronics industries, car components, circuits, fibers, semi-finished products which can be shaped by machining and the like. The use of the materials for coating articles by means of powder coating processes is also possible, as is their use as hot-melt adhesives.

These molding compositions can also be used in the production of sheets and panels having valueable properties. Such sheets and panels may be shaped by conventional processes such as vacuum processing or by hot pressing to form useful objects. The sheets and panels are also suitable as coating materials for other materials comprising, for example, wood, glass, ceramic, metal or other plastics, and outstanding strengths can be achieved using conventional adhesion promoters, for example, those based on vinyl resins. The sheets and panels can also be laminated with other plastic films and this is preferably effected by coextrusion, the sheets being bonded in the molten state. The surfaces of the sheets and panels, including those in the embossed form, can be improved or finished by conventional methods, for example by lacquering or by application of protective films.

These polymer composites are also useful for fabrication of extruded films and film laminates, as for example, films for use in food packaging. Such films can be fabricated using conventional film extrusion technique.

The invention will now be illustrated by a series of Examples, which are intended to set forth typical and preferred procedures to be utilized in the practice of the invention.

EXAMPLE 1

The preparation of a smectite-type clay composition comprising the reaction product of a smectite-type clay and a quaternary ammonium compound (80 mer) and a chain transfer agent (10 mer) is prepared as follows: 5000 grams of water is heated to 140° F., and to this is added 2M2HT quat (dimethyl-di-hydrogenated tallow ammonium chloride) at a level of 80 mer. A solution of 12N HCl is added to this solution to act as the protonating agent for the DL-cysteine. The DL-cysteine, at a level of 10 mer, is then added to the solution of the quat/HCl/H$_2$O, and mixed for a period of about 15 minutes. A slurry of an aqueous three pass slurry of montmorillonite containing 3.39% solids in a 5 gallon tank is heated to a temperature of about 140° F., and 12N HCl is added to adjust the pH from 8.8 to 6.8. This slurry is then added to the quat/DL-cysteine solution, and reacted for a period of about 45 minutes. The reaction mixture is then filtered, with pressure on the filter cake, re-slurried, and mixed for an additional period of about 10 minutes. Then, the mixture is again filtered, fluid bed dried at a temperature of about 80° C., and milled on a 0.2 mm screen to afford a montmorillonite clay intercalated with 80 mer dimethyl-di-hydrogenated tallow ammonium chloride and 10 mer DL-cysteine, with a d-spacing tracing as shown in FIG. 1.

EXAMPLE 2

Figure 2:
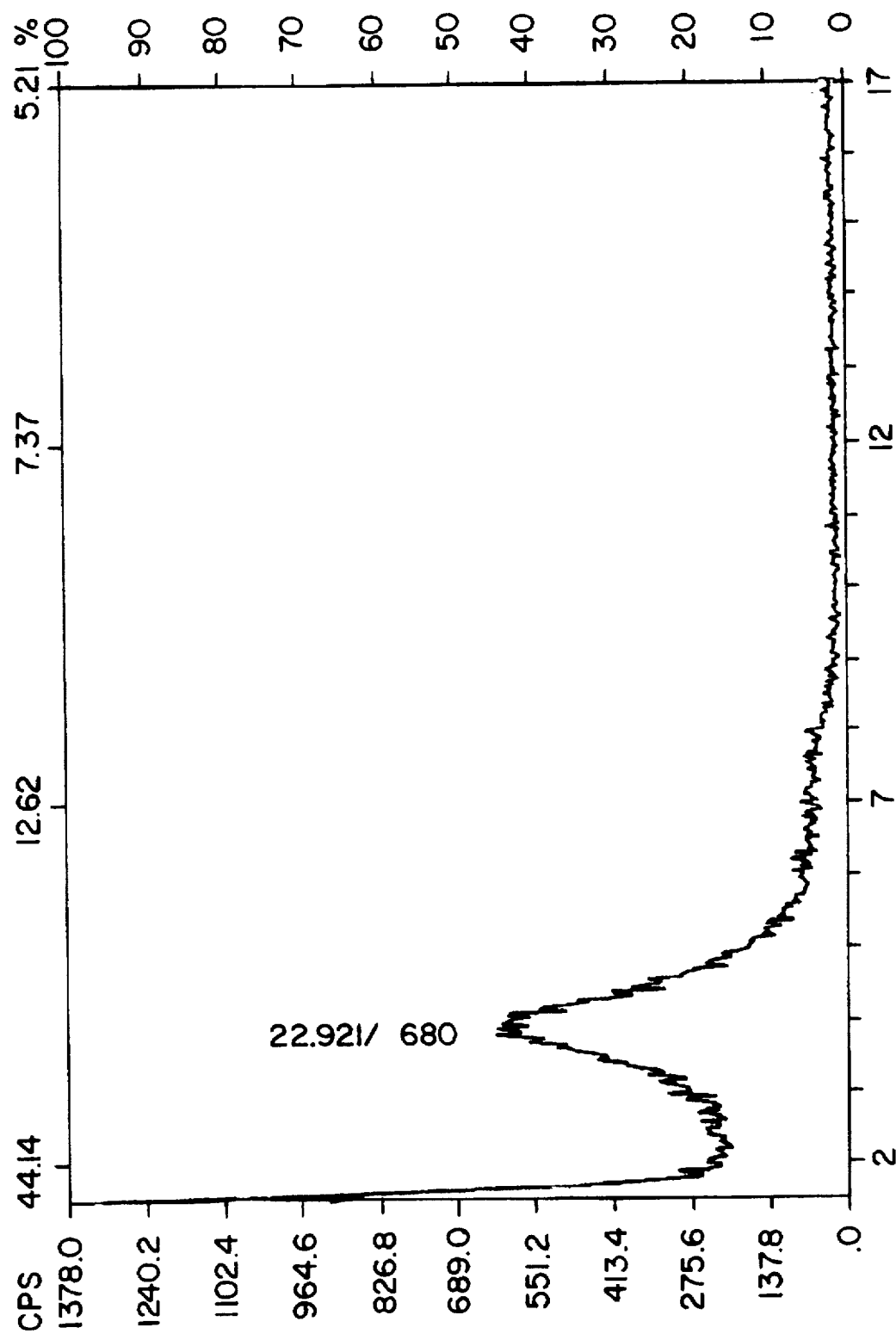
FIG. 2 is a d-spacing tracing of a montmorillonite clay intercalated with 80 mer dimethyl-di-hydrogenated tallow ammonium chloride (2M2HT) and 20 mer DL-cysteine.

The preparation of a smectite-type clay composition comprising the reaction product of a smectite-type clay and a quaternary ammonium compound (80 mer) and a chain transfer agent (20 mer) is prepared as follows:

5000 grams of water is heated to 140° F., and to this is added 2M2HT quat (dimethyl-di-hydrogenated tallow ammonium chloride) at a level of 80 mer. A solution of 12N HCl is added to this solution to act as the protonating agent for the DL-cysteine. The DL-cysteine, at a level of 20 mer, is then added to the solution of the quat/HCl/H$_2$O, and mixed for a period of about 15 minutes. A slurry of an aqueous three pass slurry of montmorillonite containing 3.39% solids in a 5 gallon tank is heated to a temperature of about 140° F., and 12N HCl is added to adjust the pH from 8.8 to 6.8. This slurry is then added to the quat/DL-cysteine solution, and reacted for a period of about 45 minutes. The reaction mixture is then filtered, with pressure on the filter cake, re-slurried, and mixed for an additional period of about 10 minutes. T hen, the mixture is again filtered, fluid bed dried at a temperature of about 80° C., and milled on a 0.2 mm screen to afford a montmorillonite clay intercalated with 80 mer dimethyl-di-hydrogenated tallow ammonium chloride and 20 mer DL-cysteine, with a d-spacing tracing as shown in FIG. 2.

EXAMPLE 3

Figure 3:
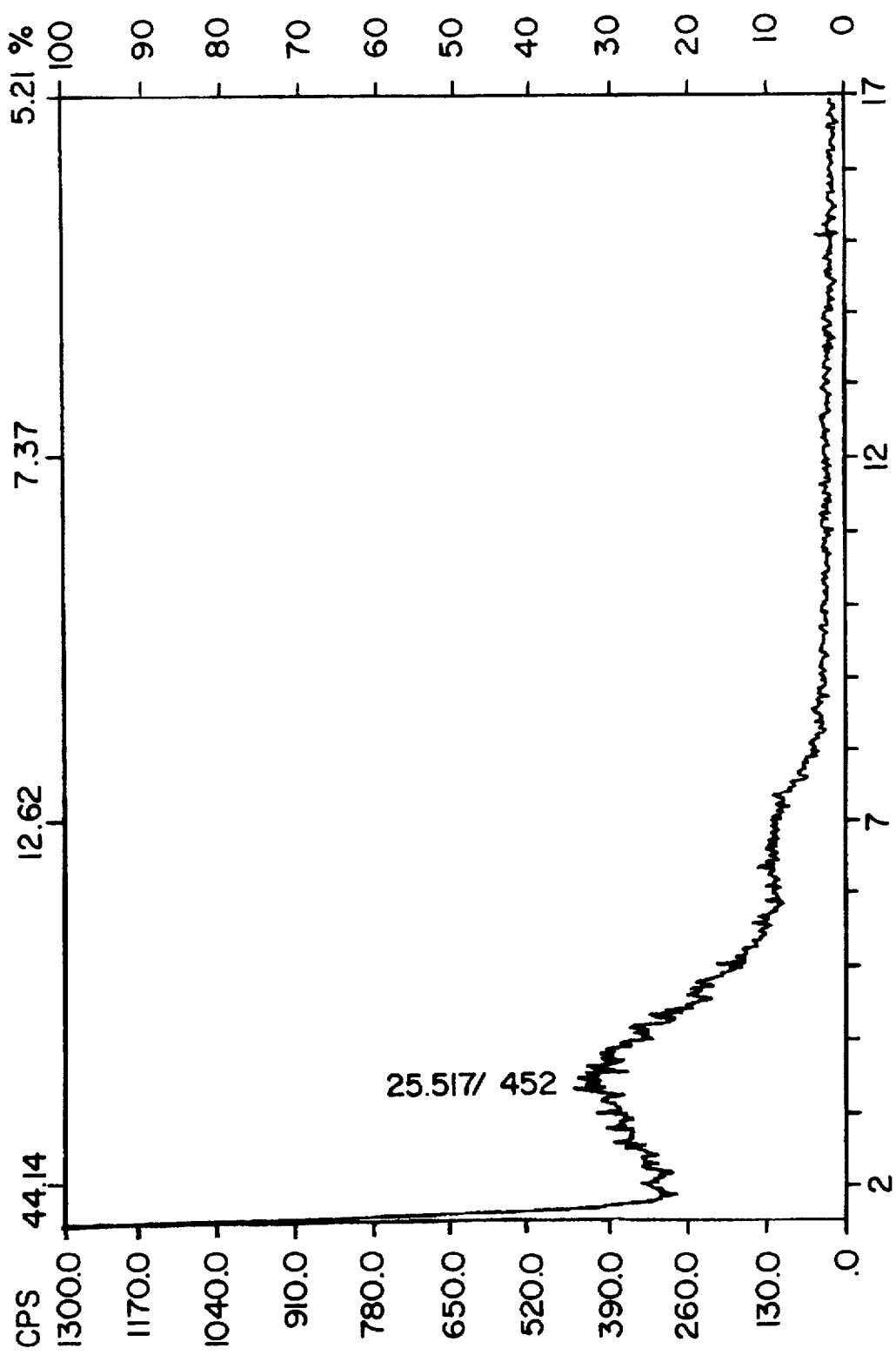
FIG. 3 is a d-spacing tracing of a montmorillonite clay intercalated with 80 mer dimethyl-di-hydrogenated tallow ammonium chloride (2M2HT) and 10 mer N,N-dimethylaminomethacrylate "Q" salt methyl chloride.

Repetition of the procedure detailed in Example 1, using 80 mer dimethyl-di-hydrogenated tallow ammonium chloride and 10 mer N,N-dimethylaminoethylmethacrylate "Q" salt methyl chloride afforded a montmorillonite clay intercalated with 80 mer dimethyl-di-hydrogenated tallow ammonium chloride and 10 mer N,N-dimethylaminoethylmethacrylate "Q" salt methyl chloride, with a d-spacing tracing as shown in FIG. 3.

EXAMPLE 4

Figure 4:
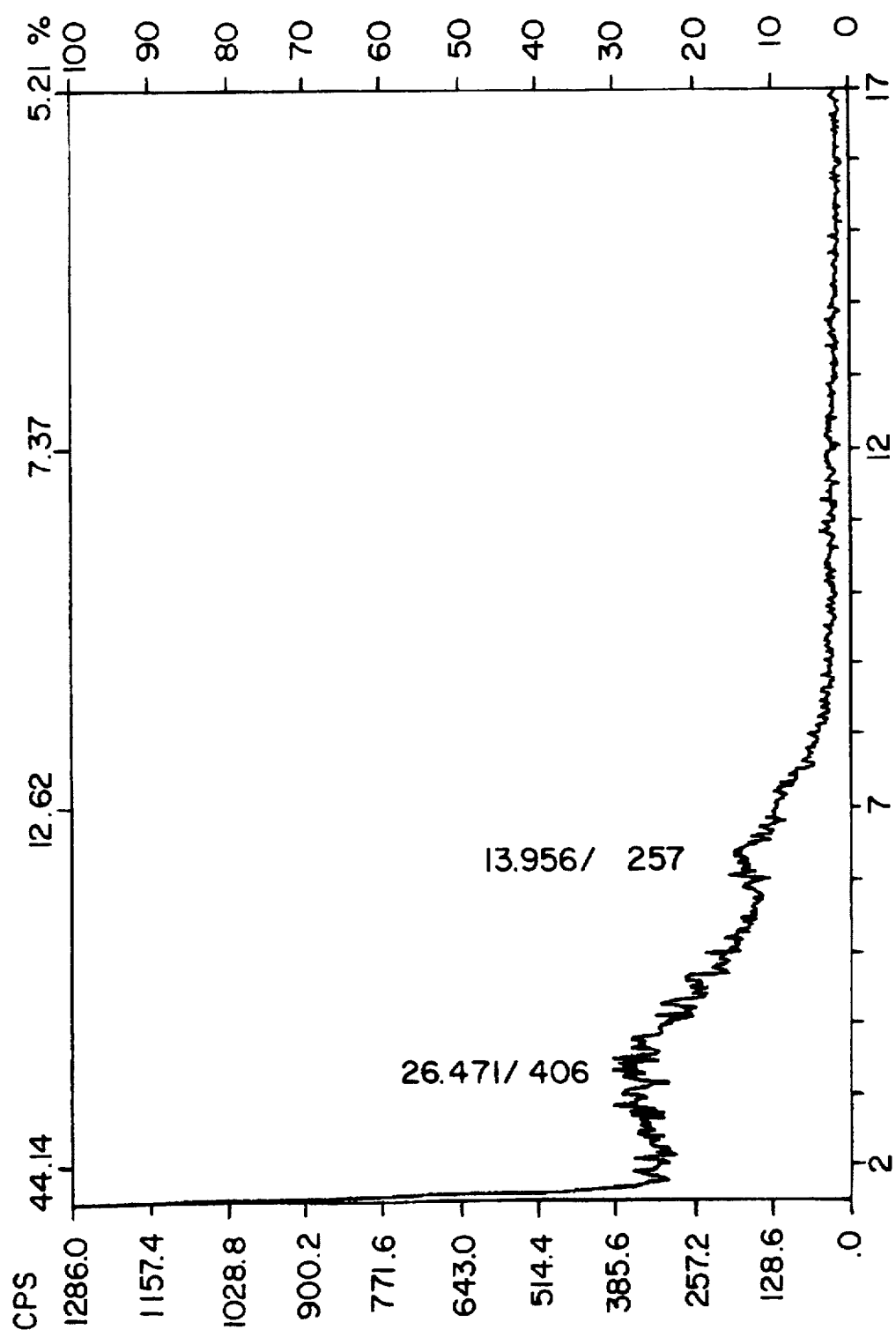
FIG. 4 is a d-spacing tracing of a montmorillonite clay intercalated with 80 mer dimethyl-di-hydrogenated tallow ammonium chloride (2M2HT) and 20 mer dimethylaminomethacrylate "Q" salt methyl chloride.

Repetition of the procedure detailed in Example 1, using 80 mer dimethyl-di-hydrogenated tallow ammonium chloride and 20 mer N,N-dimethylaminoethylmethacrylate "Q" salt methyl chloride afforded a montmorillonite clay intercalated with 80 mer dimethyl-di-hydrogenated tallow ammonium chloride and 20 mer N,N-dimethylaminoethylmethacrylate "Q" salt methyl chloride, with a d-spacing tracing as shown in FIG. 4.

What is claimed is:

1. An organoclay composition comprising a reaction product of a smectite clay having an ion exchange capacity of at least 50 meq. wt. per 100 g. clay (active basis), and a mixture of a first quaternary ammonium compound with either a second quaternary ammonium compound containing a carbon-carbon double bond, or a chain transfer agent which is a thiol, α-methylketone, or a halogen compound.

2. The composition according to claim 1 wherein the second quaternary ammonium compound is of the formula:

wherein $R_1$, $R_2$, $R_3$ and $R_4$ are independently selected from the group consisting of (a) linear or branched, saturated or unsaturated alkyl groups having 1 to 22 carbon atoms, (b) aralkyl groups which are benzyl and substituted benzyl moieties, (c) aryl groups, (d) beta, gamma-unsaturated groups having six or less carbon atoms or hydroxyalkyl groups having two to six carbon atoms, and (e) hydrogen, with the proviso that at least one of the substituents is a linear or branched unsaturated alkyl group; and X is the salt anion.

3. The composition according to claim 1 wherein the chain transfer agent is a thiol.

4. The composition according to claim 2 wherein the first quaternary ammonium compound is dimethyl-di-hydrogenated tallow ammonium chloride and the chain transfer agent is DL-cysteine.

5. A process for the preparation of an organoclay composition comprising a reaction product of a smectite clay having an ion exchange capacity of at least 50 meq. wt. per 100 g. clay (active basis), and a mixture of a first quaternary ammonium compound with either a second quaternary ammonium compound containing a carbon-carbon double bond, or a chain transfer agent which is a thiol, α-methylketone, or a halogen compound, which comprises:

a) dispersing a smectite clay having an ion exchange capacity of at least 50 meq. wt. per 100 g. clay, in an aqueous media to form a dispersion;

b) heating the dispersion of step (a) to a temperature in excess of 30° C.;

c) adding to the heated dispersion of step (b) a first quaternary ammonium salt, in the milliequivalent ratio to form a mixture;

d) adding the mixture of step (c) to a solution of the second quaternary ammonium compound or chain transfer agent, pretreated with a strong mineral acid, if necessary; and e) agitating the mixture of step (d) to effect completion of the reaction.

6. The process according to claim 5 wherein the second quaternary ammonium compound has the formula

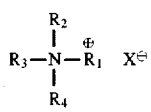 (I)

wherein $R_1$, $R_2$, $R_3$ and $R_4$ are independently selected from the group consisting of (a) linear or branched, saturated or unsaturated alkyl groups having 1 to 22 carbon atoms, (b) aralkyl groups which are benzyl and substituted benzyl moieties, (c) aryl groups, (d) beta, gamma-unsaturated groups having six or less carbon atoms or hydroxyalkyl groups having two to six carbon atoms, and (e) hydrogen, with the proviso that at least one of the substituents is a linear or branched unsaturated alkyl group; and X is the salt anion.

7. The process according to claim 5 wherein the chain transfer agent is a thiol.

8. The process according to claim 5 wherein the first quaternary ammonium compound is dimethyl-dihydrogenated tallow ammonium chloride and the chain transfer agent is DL-cysteine.

* * * * *